US012641549B2

(12) United States Patent
Cheng et al.

(10) Patent No.: US 12,641,549 B2
(45) Date of Patent: May 26, 2026

(54) POWER HEADROOM REPORT TRIGGERING BY DORMANT BANDWIDTH PART SWITCHING

(71) Applicant: QUALCOMM INCORPORATED, San Diego, CA (US)

(72) Inventors: Peng Cheng, Beijing (CN); Linhai He, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

(21) Appl. No.: 17/999,551

(22) PCT Filed: Jul. 6, 2020

(86) PCT No.: PCT/CN2020/100391
§ 371 (c)(1),
(2) Date: Nov. 21, 2022

(87) PCT Pub. No.: WO2022/006696
PCT Pub. Date: Jan. 13, 2022

(65) Prior Publication Data
US 2023/0209479 A1     Jun. 29, 2023

(51) Int. Cl.
*H04W 52/36* (2009.01)
*H04W 76/15* (2018.01)
*H04W 76/20* (2018.01)

(52) U.S. Cl.
CPC ......... *H04W 52/365* (2013.01); *H04W 76/15* (2018.02); *H04W 76/20* (2018.02)

(58) Field of Classification Search
CPC ................................................. H04W 52/365
See application file for complete search history.

(56) References Cited

U.S. PATENT DOCUMENTS

2015/0304968 A1*   10/2015   Kim ...................... H04W 72/21
                                                           370/329
2017/0127473 A1*    5/2017   Virtej ................ H04W 36/0069
                            (Continued)

FOREIGN PATENT DOCUMENTS

CN          110034799 A       7/2019
CN          110351822 A      10/2019
                    (Continued)

OTHER PUBLICATIONS

PHR triggering for dormant BWP (Year: 2020).*
                    (Continued)

*Primary Examiner* — Pamit Kaur
(74) *Attorney, Agent, or Firm* — Holland & Hart LLP

(57) ABSTRACT

Methods, systems, and devices for wireless communications are described. According to one or more aspects, a device, such as a user equipment (UE), may establish a primary cell (PCell) connection and a secondary cell (SCell) connection which may trigger a power headroom (PHR) report and initiate a timer for PHR reporting based on the triggering. The UE may configure a bandwidth part (BWP) associated with the SCell connection to operate in a first dormancy state. The UE may receive an indication to configure the SCell BWP to operate in a second dormancy state and may switch the SCell BWP operations to the second dormancy state. The UE ay determine a status of the timer for PHR reporting and may determine whether to transmit a PHR report based on the status of the timer and the indication to switch the BWP operations.

33 Claims, 11 Drawing Sheets

(56)             References Cited

U.S. PATENT DOCUMENTS

2019/0357264 A1     11/2019  Yi et al.
2021/0377852 A1*  12/2021  Zhou ................. H04W 52/0235

FOREIGN PATENT DOCUMENTS

| CN | 110381527 A | 10/2019 |
|----|-------------|---------|
| CN | 110636626 A | 12/2019 |
| CN | 111095998 A | 5/2020 |
| WO | WO-2018075828 A1 | 4/2018 |

OTHER PUBLICATIONS

Ericsson: "PHR Triggering for Dormant BWP," 3GPP TSG-RAN
WG2 #110-e, Tdoc R2- 2005115, Jun. 1-12, 2020 (Jun. 12, 2020)
section 2, 3 pages.
International Search Report and Written Opinion—PCT/CN2020/
100391—ISA/EPO—Apr. 1, 2021 (205992WO1).

\* cited by examiner

Connection Manager

710

BWP Operations Manager

720

PHR Report Manager

730

Timer Manager

715

Switching Manager

725

705

700

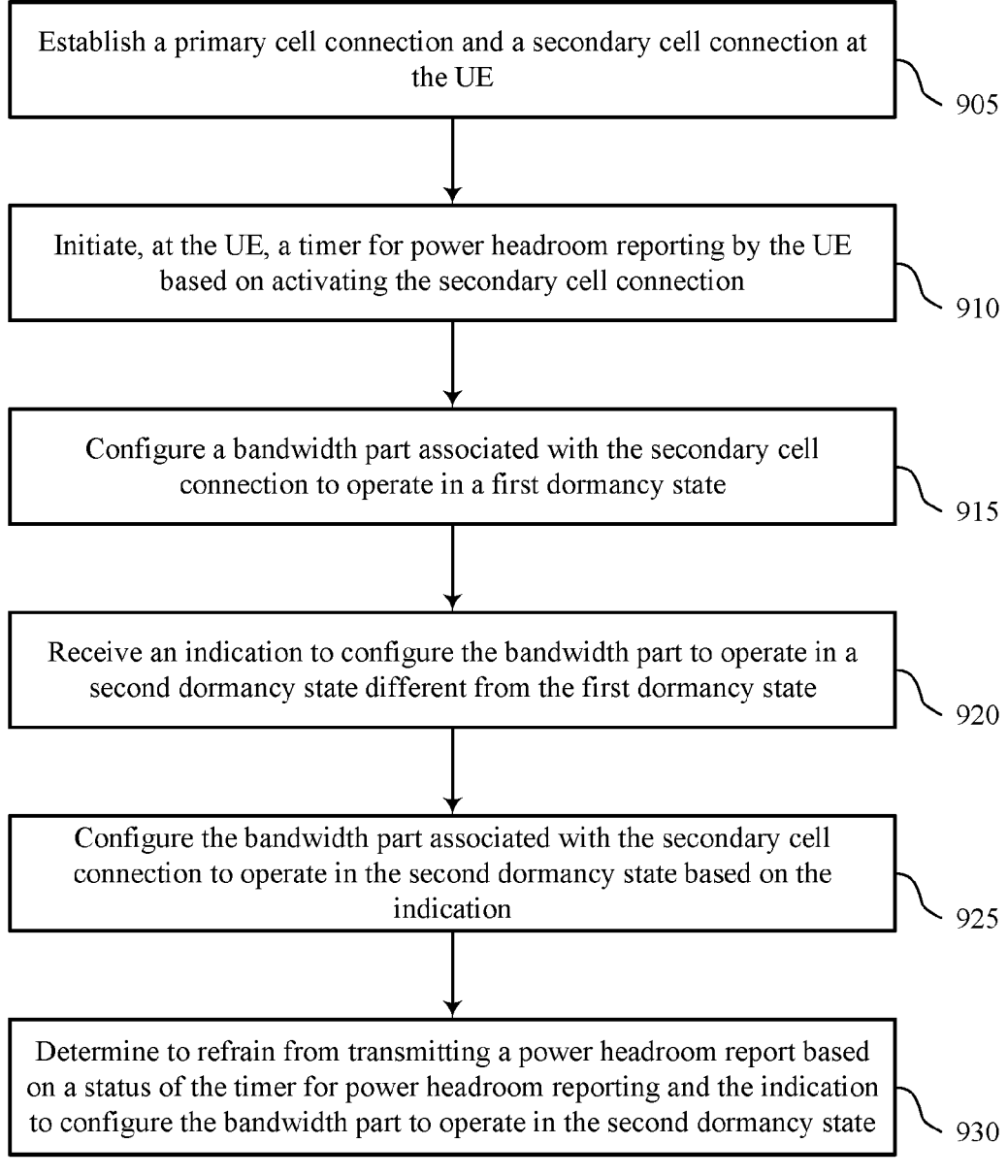

Establish a primary cell connection and a secondary cell connection at the UE

905

Initiate, at the UE, a timer for power headroom reporting by the UE based on activating the secondary cell connection

910

Configure a bandwidth part associated with the secondary cell connection to operate in a first dormancy state

915

Receive an indication to configure the bandwidth part to operate in a second dormancy state different from the first dormancy state

920

Configure the bandwidth part associated with the secondary cell connection to operate in the second dormancy state based on the indication

925

Determine to refrain from transmitting a power headroom report based on a status of the timer for power headroom reporting and the indication to configure the bandwidth part to operate in the second dormancy state

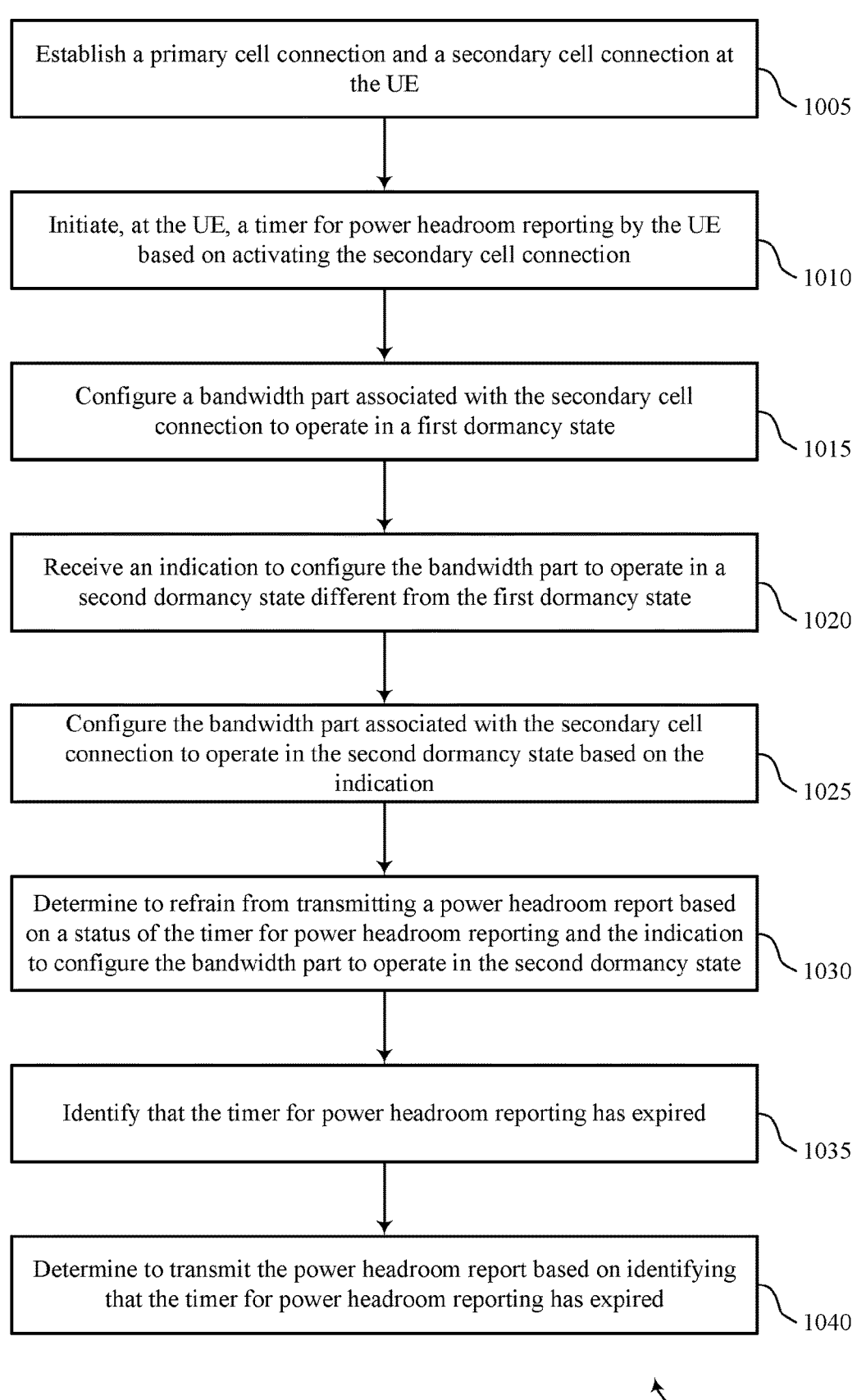

Establish a primary cell connection and a secondary cell connection at the UE

1005

Initiate, at the UE, a timer for power headroom reporting by the UE based on activating the secondary cell connection

1010

Configure a bandwidth part associated with the secondary cell connection to operate in a first dormancy state

1015

Receive an indication to configure the bandwidth part to operate in a second dormancy state different from the first dormancy state

1020

Configure the bandwidth part associated with the secondary cell connection to operate in the second dormancy state based on the indication

1025

Determine to refrain from transmitting a power headroom report based on a status of the timer for power headroom reporting and the indication to configure the bandwidth part to operate in the second dormancy state

1030

Identify that the timer for power headroom reporting has expired

1035

Determine to transmit the power headroom report based on identifying that the timer for power headroom reporting has expired

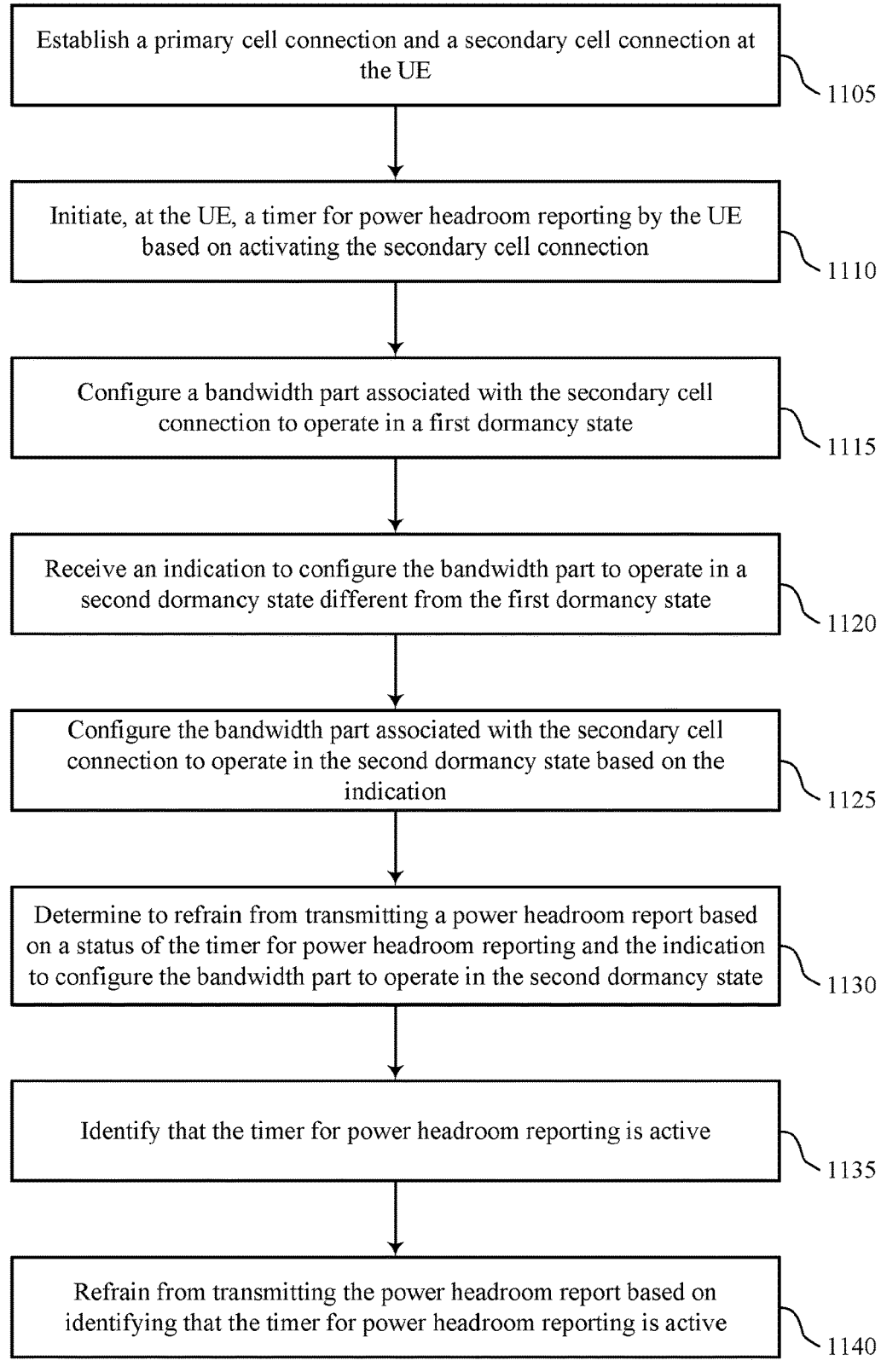

Establish a primary cell connection and a secondary cell connection at the UE

1105

Initiate, at the UE, a timer for power headroom reporting by the UE based on activating the secondary cell connection

1110

Configure a bandwidth part associated with the secondary cell connection to operate in a first dormancy state

1115

Receive an indication to configure the bandwidth part to operate in a second dormancy state different from the first dormancy state

1120

Configure the bandwidth part associated with the secondary cell connection to operate in the second dormancy state based on the indication

1125

Determine to refrain from transmitting a power headroom report based on a status of the timer for power headroom reporting and the indication to configure the bandwidth part to operate in the second dormancy state

1130

Identify that the timer for power headroom reporting is active

1135

Refrain from transmitting the power headroom report based on identifying that the timer for power headroom reporting is active

POWER HEADROOM REPORT TRIGGERING BY DORMANT BANDWIDTH PART SWITCHING

CROSS REFERENCE

The present Application is a 371 national stage filing of International PCT Application No. PCT/CN2020/100391 by CHENG et al. entitled "POWER HEADROOM REPORT TRIGGERING BY DORMANT BANDWIDTH PART SWITCHING," filed Jul. 6, 2020, which is assigned to the assignee hereof, and which is expressly incorporated by reference in its entirety herein.

FIELD OF TECHNOLOGY

The following relates generally to wireless communications and more specifically to power headroom report (PHR) triggering by dormant bandwidth part (BWP) switching.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power headroom report (PHR) triggering by dormant bandwidth part (BWP) switching. Generally, the described techniques provide for PHR reporting mechanisms. In some wireless communication systems (e.g., new radio (NR), fifth generation (5G, and the like)), PHR reporting may be triggered in a number of cases for a UE. For example, a UE configured with a primary cell (PCell) and a secondary cell (SCell) may receive an indication via a dormancy downlink control indication (DCI) to switch between BWP operation states for the SCell. For example, a base station may transmit the dormancy indication to the UE to switch SCell BWP operations from a dormant BWP state to a non-dormant BWP state. PHR reporting may be triggered upon activation of the SCell and may be triggered when such a switching operation occurs, which may cause frequent or redundant PHR reporting.

To avoid frequent or redundant PHR reporting when SCell BWP operation is switched from a dormant state to a non-dormant state, a PHR trigger condition may be defined. For example, a timer may be initiated when an SCell is activated, when a PHR report is triggered or transmitted or both. When the UE switches the SCell BWP operations dormancy states, the PHR report may be triggered and the UE may determine a status of the timer (e.g., whether or not the timer has expired). The UE may transmit the PHR report based on the trigger and the timer status. The timer may be restarted based on transmitting the PHR report.

A method of wireless communications at a UE is described. The method may include establishing a primary cell connection and a secondary cell connection at the UE, initiating, at the UE, a timer for power headroom reporting by the UE based on activating the secondary cell connection, configuring a bandwidth part associated with the secondary cell connection to operate in a first dormancy state, receiving an indication to configure the bandwidth part to operate in a second dormancy state different from the first dormancy state, configuring the bandwidth part associated with the secondary cell connection to operate in the second dormancy state based on the indication, and determining to refrain from transmitting a power headroom report based on a status of the timer for power headroom reporting and the indication to configure the bandwidth part to operate in the second dormancy state.

An apparatus for wireless communications at a UE is described. The apparatus may include a processor, memory coupled with the processor, and instructions stored in the memory. The instructions may be executable by the processor to cause the apparatus to establish a primary cell connection and a secondary cell connection at the UE, initiate, at the UE, a timer for power headroom reporting by the UE based on activating the secondary cell connection, configure a bandwidth part associated with the secondary cell connection to operate in a first dormancy state, receive an indication to configure the bandwidth part to operate in a second dormancy state different from the first dormancy state, configure the bandwidth part associated with the secondary cell connection to operate in the second dormancy state based on the indication, and determine to refrain from transmitting a power headroom report based on a status of the timer for power headroom reporting and the indication to configure the bandwidth part to operate in the second dormancy state.

Another apparatus for wireless communications at a UE is described. The apparatus may include means for establishing a primary cell connection and a secondary cell connection at the UE, initiating, at the UE, a timer for power headroom reporting by the UE based on activating the secondary cell connection, configuring a bandwidth part associated with the secondary cell connection to operate in a first dormancy state, receiving an indication to configure the bandwidth part to operate in a second dormancy state different from the first dormancy state, configuring the bandwidth part associated with the secondary cell connection to operate in the second dormancy state based on the indication, and determining to refrain from transmitting a power headroom report based on a status of the timer for power headroom reporting and the indication to configure the bandwidth part to operate in the second dormancy state.

A non-transitory computer-readable medium storing code for wireless communications at a UE is described. The code may include instructions executable by a processor to establish a primary cell connection and a secondary cell connection at the UE, initiate, at the UE, a timer for power headroom reporting by the UE based on activating the secondary cell connection, configure a bandwidth part associated with the secondary cell connection to operate in a first dormancy state, receive an indication to configure the bandwidth part to operate in a second dormancy state different from the first dormancy state, configure the bandwidth part associated with the secondary cell connection to operate in the second dormancy state based on the indication, and determine to refrain from transmitting a power headroom report based on a status of the timer for power headroom reporting and the indication to configure the bandwidth part to operate in the second dormancy state.

In some examples of the method, apparatuses, and non-transitory computer-readable medium described herein, determining whether to transmit the power headroom report further may include operations, features, means, or instructions for identifying that the timer for power headroom reporting may have expired, and determining to transmit the power headroom report based on identifying that the timer for power headroom reporting may have expired.

Some examples of the method, apparatuses, and non-transitory computer-readable medium described herein may further include operations, features, means, or instructions for restarting, at the UE, the timer for power headroom reporting by the UE based on transmitting the power headroom report.

In some examples of the method, apparatuses, and non-transitory computer-readable medium described herein, determining whether to transmit the power headroom report further may include operations, features, means, or instructions for identifying that the timer for power headroom reporting may be active, and refraining from transmitting the power headroom report based on identifying that the timer for power headroom reporting may be active.

In some examples of the method, apparatuses, and non-transitory computer-readable medium described herein, receiving the indication to configure the bandwidth part to operate in the second dormancy state different from the first dormancy state may include operations, features, means, or instructions for receiving the indication in a physical downlink control channel transmission.

In some examples of the method, apparatuses, and non-transitory computer-readable medium described herein, the indication includes dormancy DCI.

Some examples of the method, apparatuses, and non-transitory computer-readable medium described herein may further include operations, features, means, or instructions for initiating the timer for power headroom reporting may be based on a previous power headroom report transmission.

In some examples of the method, apparatuses, and non-transitory computer-readable medium described herein, configuring the bandwidth part associated with the secondary cell connection to operate in the second dormancy state may include operations, features, means, or instructions for configuring the bandwidth part associated with the secondary cell connection to change from a dormant state to a non-dormant state, where the bandwidth part may be associated with a medium access control (MAC) entity with configured uplink.

Some examples of the method, apparatuses, and non-transitory computer-readable medium described herein may further include operations, features, means, or instructions for receiving a downlink control message indicating a duration for the timer, and configuring the timer according to the duration.

Some examples of the method, apparatuses, and non-transitory computer-readable medium described herein may further include operations, features, means, or instructions for receiving a dormancy state configuration that includes one or more dormancy parameters for operating in the first dormancy state or the second dormancy state.

In some examples of the method, apparatuses, and non-transitory computer-readable medium described herein, the first dormancy state may be a dormant state and the second dormancy state may be a non-dormant state.

In some examples of the method, apparatuses, and non-transitory computer-readable medium described herein, the timer includes a phr-ProhibitTimer.

BRIEF DESCRIPTION OF THE DRAWINGS

FIGS. 9 through 11 show flowcharts illustrating methods that support PHR report triggering by dormant BWP switching in accordance with aspects of the present disclosure.

DETAILED DESCRIPTION

Figure 1:
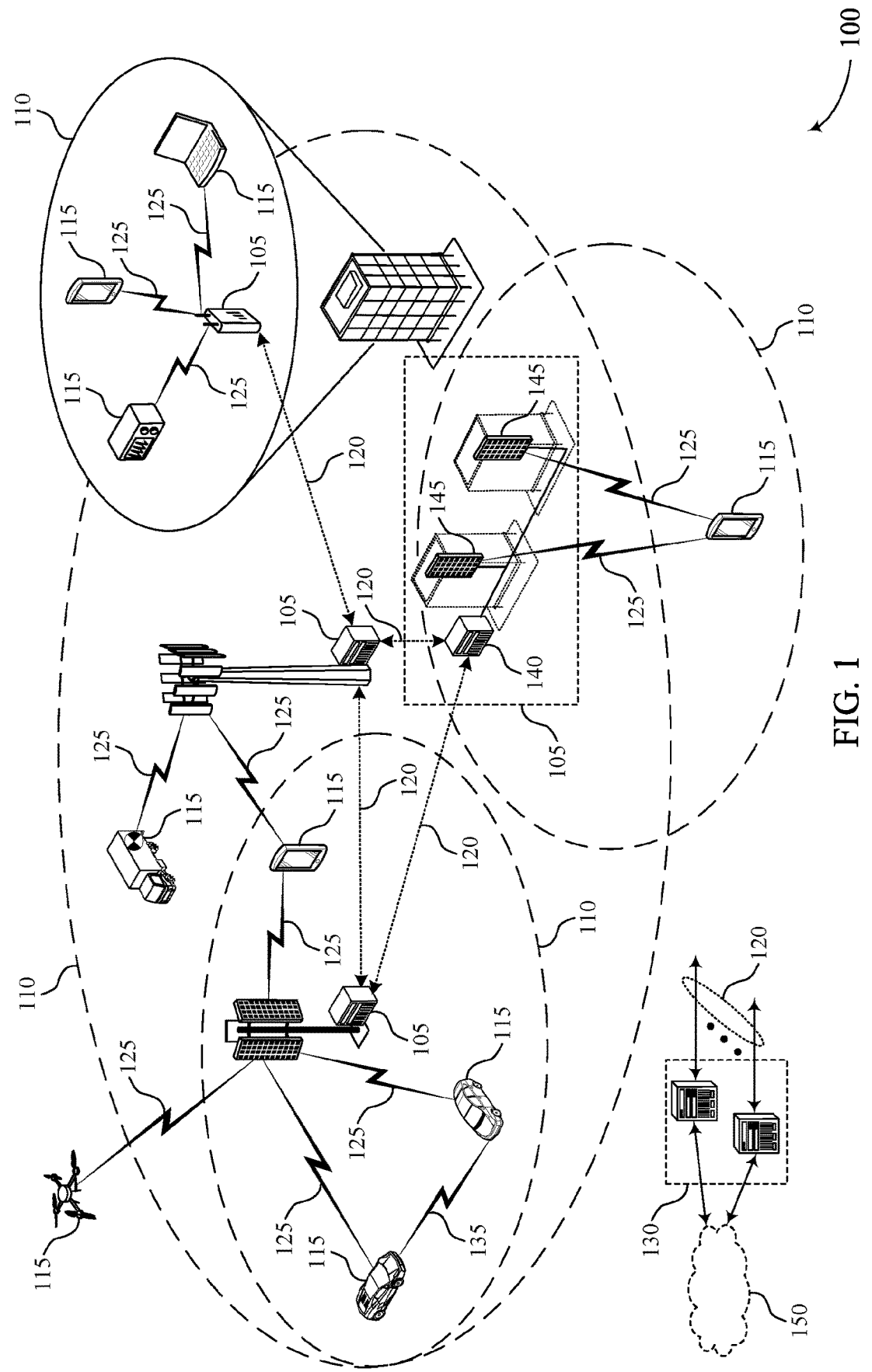
FIG. 1 illustrates an example of a system for wireless communications that supports power headroom (PHR) report triggering by dormant bandwidth part (BWP) switching in accordance with aspects of the present disclosure.

Some wireless communications system may implement a number of power management techniques for wireless devices, including supporting power headroom (PHR) reporting. For example, a user equipment (UE) may calculate a PHR (e.g., an indication of a difference between a maximum transmission power and a transmission power of a current transmission) and transmit a PHR report to a base station. The PHR report may reflect PHR for uplink (UL) messages that include control or data, such as a physical uplink control channel (PUCCH) or a physical uplink shared channel (PUSCH), or any combination of these. The PHR report may accordingly be used to improve resource allocation for transmissions between the UE and the base station. For example, based on a received PHR, the base station may determine whether the bandwidth allocated to the UE may be increased or decreased.

A UE may support carrier aggregation, where the UE communicates with multiple cells simultaneously. For example, the UE may communicate with a first base station (e.g., a primary cell (PCell), a first component carrier, etc.) and with a second base station (e.g., a secondary cell (SCell), a second component carrier, etc.) at the same time. Additionally or alternatively, a single base station may include multiple cells (e.g., both a PCell and an SCell, multiple component carriers, etc.), where the UE communicates with two or more cells on the single base station at the same time.

PHR reporting may be implemented in systems where a UE may be configured to communicate with one or more serving cells and may be triggered when an SCell is activated or established. A UE may also be configured to communicate in various dormancy states with one or more serving cells and may be configured to switch between dormancy states for a particular serving cell. A PHR report may also be triggered when a UE switches between dormancy states. For example, a UE may be configured with a PCell and an SCell. In some cases, a PHR report may be triggered based on the activation of the SCell. The network may indicate to the UE (e.g., via dormancy DCI, physical downlink control channel (PDCCH)) to switch the SCell bandwidth part (BWP) operating in a first dormancy state to switch to operating in a second dormancy state. For example, the base station may indicate to the UE to switch from dormant operations to non-dormant operations on the SCell, which may trigger a PHR report. The PHR report may be triggered each time the base station transmits a dormancy indication (e.g., dormancy DCI) to switch dormancy states. When the base station switches dormancy states frequently, the PHR reports may be unnecessarily frequent and result in increased power consumption at the UE.

In some cases, the UE may implement a timer for PHR report triggering. For example, a PHR report may be triggered based on the activation of the SCell and the UE may initiate a timer based on the PHR report trigger. The network may indicate to the UE (e.g., dormancy DCI via PDCCH) to switch the SCell BWP from a first dormancy state to a second dormancy state (e.g., from dormant operations to non-dormant operations) which may trigger the PHR report. The UE may determine a state of the timer and the PHR report may be transmitted based on the PHR report trigger and the state of the timer. In such cases, the UE may not transmit a PHR report each time the base station transmits a dormancy indication, and may transmit the PHR report upon triggering when the timer has expired which may avoid frequent or redundant PHR reporting. For example, upon a change of an activated BWP to non-dormant downlink (DL) BWP of an SCell of any medium access control (MAC) entity with configured uplink, a PHR report may be triggered at the UE when the timer expires or has expired, but not if the timer is still running. In some cases, the timer may be a phr-ProhibitTimer which may be implemented or used for other operations such as triggering a PHR report when the time has expired and a pathloss has exceeded a threshold for a serving cell associated with the UE. In this way, the timer may be used for multiple operations and may conserve operating overhead.

Aspects of the disclosure are initially described in the context of wireless communications systems. Further examples are then provided that illustrate PHR report triggering conditions based on a timer for PHR report triggering. Aspects of the disclosure are further illustrated by and described with reference to apparatus diagrams, system diagrams, and flowcharts that relate to PHR report triggering by dormant BWP switching.

FIG. 1 illustrates an example of a wireless communications system 100 that supports PHR report triggering by dormant BWP switching in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured with number of serving cell connections and may transmit a PHR report based on the configuration. For example, PHR reporting may be triggered in a number of cases for the UE 115. For example, PHR reporting may be triggered when the UE 115 establishes a connection with an SCell. PHR reporting may be triggered when the UE 115 receives a dormancy indication via a control channel transmission from a base station 105. The dormancy indication may prompt the UE 115 to switch between BWP operation states for the SCell. For example, the base station 105 may transmit the dormancy indication to the UE 115 to switch SCell BWP operations from a dormant BWP state to a non-dormant BWP state. PHR reporting may be triggered upon activation of the SCell and may be triggered when such a switching operation occurs, which may cause frequent or redundant PHR reporting.

To avoid frequent or redundant PHR reporting when SCell BWP operation is switched from a dormant state to a non-dormant state, a PHR trigger condition may be defined. For example, a timer may be initiated when an SCell is activated, when a PHR report is triggered or transmitted or both. When the UE switches the SCell BWP operations dormancy states, the PHR report may be triggered and the UE may determine a status of the timer (e.g., whether or not the timer has expired) may transmit the PHR report based on the trigger and the timer status. The timer may be restarted based on transmitting the PHR report.

For example, the UE 115 may establish a PCell connection and an SCell connection which may trigger a PHR report and may initiate a timer for PHR reporting based on the triggering. The UE 115 may configure the BWP associated with the SCell connection to operate in a first dormancy state (e.g., dormant BWP with reduced operations at the UE 115). The UE 115 may receive an indication to configure the SCell BWP to operate in a second dormancy state (e.g., non-dormant BWP) and may switch the SCell BWP operations to the second dormancy state. The UE may determine a status of the timer for PHR reporting and may determine whether to transmit a PHR report based on the status of the timer and the indication to switch the BWP operations.

Figure 2:
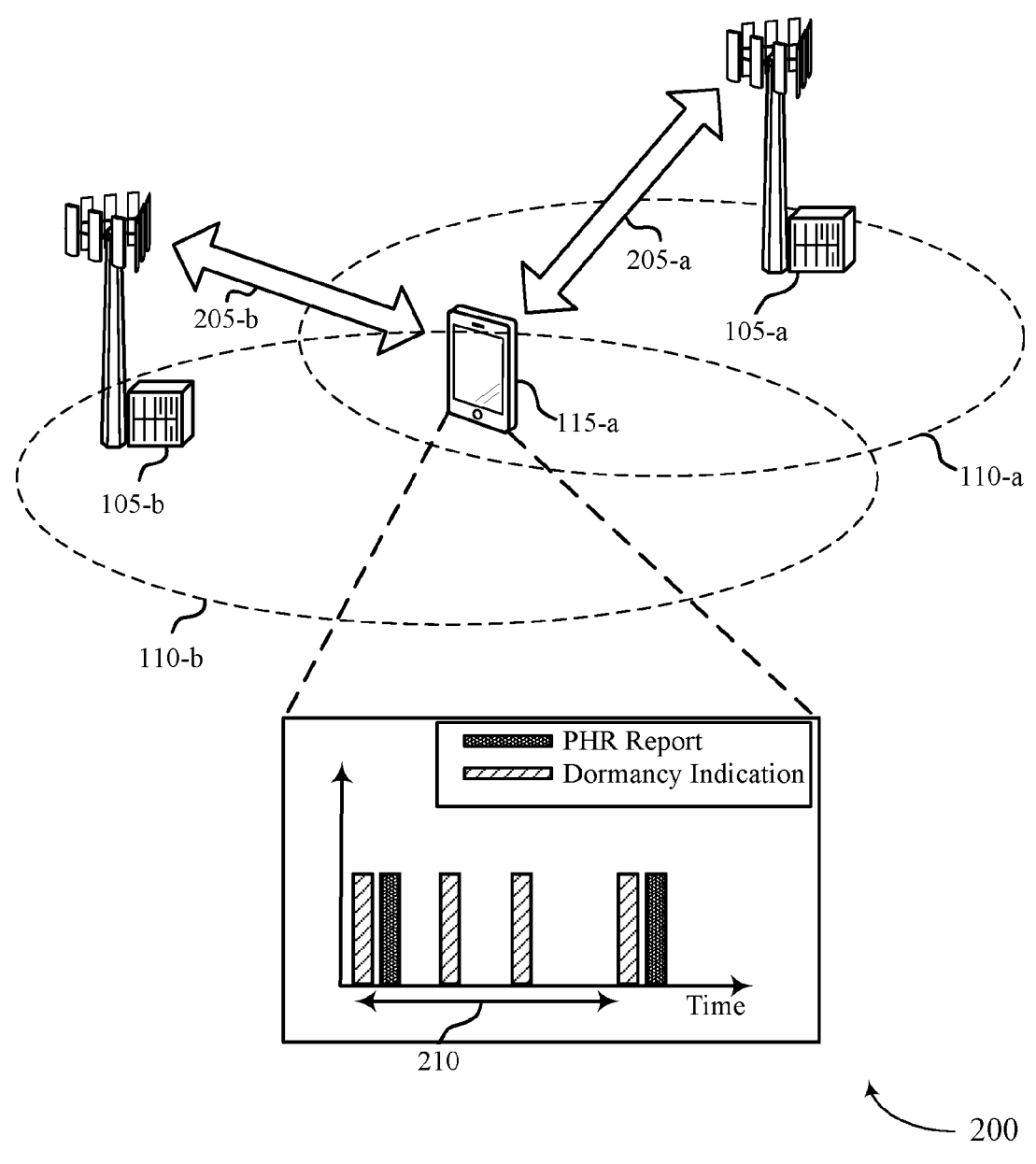
FIG. 2 illustrates an example of a wireless communications system that supports PHR report triggering by dormant BWP switching in accordance with aspects of the present disclosure.

FIG. 2 illustrates an example of a wireless communications system 200 that supports PHR report triggering by dormant BWP switching in accordance with aspects of the present disclosure. In some examples, wireless communications system 200 may implement aspects of wireless communications system 100. Wireless communications system 200 may include base stations 105-a, 105-b, and UE 115-a, which may be examples of the corresponding devices as described with reference to FIG. 1. The UE 115-a may be an example of a MAC entity with configured UL. Wireless communications system 200 may be an example of a system that supports PHR report triggering by dormant BWP switching.

The UE 115-a may support carrier aggregation and may communicate with multiple cells simultaneously. For example, the UE 115-a may communicate with a first base station 105-a (e.g., a primary cell (PCell), a first component carrier, etc.) and with a second base station 105-b (e.g., a secondary cell (SCell), a second component carrier, etc.) at the same time. Additionally or alternatively, a single base station may include multiple cells (e.g., both a PCell and an SCell, multiple component carriers, etc.), where the UE 115-a communicates with two or more cells on the single base station at the same time. For example, the UE 115-a may establish a PCell connection 205-a with the base station 105-a in coverage area 110-a and may establish an SCell connection 205-b with base station 105-b in coverage area 110-b. In some examples, the UE 115-a may establish a PCell connection 205-a and an SCell connection 205-b with a same base station (e.g., base station 105-a or base station 105-b).

The UE 115-a may be configured to calculate a PHR (e.g., an indication of a difference between a maximum transmission power and a transmission power of a current transmission) and transmit a PHR report to the base station 105-a via PCell connection 205-a. The PHR report may reflect PHR for UL messages that include control or data, such as PUCCH or PUSCH. The PHR report may accordingly be used to improve resource allocation for transmissions between the UE 115-a and the base station 105-a or 105-b. For example, based on a received PHR, the base station 105-a may determine whether the bandwidth allocated to the UE 115-a may be increased or decreased.

PHR reporting may be enabled and the UE 115-a may be configured to communicate over the PCell connection 205-a and the SCell connection 205-b. PHR reporting may be triggered when the SCell connection 205-b is activated or established. The UE 115-a may also be configured to communicate in various dormancy states over the PCell connection 205-a and the SCell connection 205-b, and may be configured to switch between dormancy states for a particular serving cell connection (e.g., one of PCell connection 205-a or SCell connection 205-b). The PHR report may also be triggered when the UE configures the BWP associated with the SCell connection 205-b to switch between dormancy states. For example, the base station 105-a may transmit control information (e.g., PDCCH) to the UE 115-a over the PCell connection 205-a including a dormancy indication (e.g., dormancy DCI) to switch the SCell BWP from operating in a first dormancy state to switch to operating in a second dormancy state. For example, the base station 105-a may indicate to the UE 115-b to switch from dormant operations to non-dormant operations on the SCell connection 205-b which may trigger a PHR report. The PHR report may be triggered each time the base station 105-*a* transmits a dormancy indication (e.g., dormancy DCI) to switch dormancy states. In some cases, the UE 115-*a* may implement a timer 210 for PHR report triggering. For example, a PHR report may be triggered based on the activation of the SCell connection 205-*b* and the UE 115-*a* may initiate the timer 210 based on the PHR report transmission. The base station 105-*a* may indicate to the UE 115-*a* (e.g., transmit the dormancy DCI via PDCCH) to switch the SCell BWP from the first dormancy state to the second dormancy state (e.g., from dormant operations to non-dormant operations) which may trigger the PHR report. The UE 115-*a* may determine a state of the timer 210 and the PHR report may be transmitted to the base station 105-*a* based on the PHR report trigger and the state of the timer 210. In such cases, the UE 115-*a* may not transmit a PHR report each time the base station 105-*a* transmits the dormancy indication and may transmit the triggered PHR report when the timer has expired which may avoid frequent or redundant PHR reporting.

The base station 105-*a* may transmit the dormancy indication to UE 115-*a* to switch between a non-dormant BWP and a dormant BWP so the UE 115-*a* may switch between non-dormant behavior and dormant behavior on the SCell connection 205-*b*. The base station 105-*a* may specify behavior in dormant and non-dormant BWP operations. For example, in dormant BWP operations the UE 115-*a* may reduce activity, may operate on a reduced bandwidth, may refrain from transmitting uplink data or control information (e.g., the UE 15-*a* may not transmit PUSCH, PUCCH, sounding reference signal (SRS)), may not receive or monitor form downlink data or control transmissions, may reduce a periodicity of channel state information (CSI) measurement, may sleep between UL and DL transmission or reception and may generally implement power-saving operations, among other aspects over the SCell connection 205-*b*. In non-dormant BWP operations, the UE 115-*a* may resume or implement regular operational aspects including operating on a larger bandwidth for high data transmission rates over the SCell connection 205-*b*. The UE 115-*a* may switch SCell BWP operations from dormant to non-dormant based on receiving the dormancy indication (e.g., dormancy DCI) via the control channel transmission (e.g., PDCCH).

The UE 115-*a* may transmit a PHR report to the base station 105-*a* to indicate power availability at the UE 115-*a* for one or more cells associated with the UE 115-*a* (e.g., PCell connection 205-*a* and SCell connection 205-*b*). The PHR report may be triggered based on a number of conditions. For example, the UE 115-*a* may transmit a PHR report when the timer 210 (e.g., phr-ProhibitTimer) expires or has expired and a pathloss over the PCell connection 205-*a* or the SCell connection 205-*b* has exceeded a threshold (e.g., Tx-PowerFactorChange) for at least one cell connection associated with the UE 115-*a*. In some cases, the UE 115-*a* may transmit the PHR report when a PHR report periodicity timer (e.g., phr-PeriodicTimer) expires. In some cases, the UE 115-*a* may transmit a PHR report upon a configuration or reconfiguration of PHR reporting functionality by higher layers if the PHR report functionality has not been disabled. In some cases, the UE 115-*a* may transmit the PHR report upon the activation of the SCell connection 205-*b* if the UE 115-*a* is a MAC entity with configured UL functionality. In some cases, the UE 115-*a* may transmit the PHR report upon an addition of a PSCell or when a PSCell is changed.

In some examples, the UE 115-*a* may not transmit data or control information for dormant BWP operations, and may not include SCell connection 205-*b* PHR information in the PHR report when the active SCell BWP is a dormant BWP. Additionally, in some cases, a PHR report may be triggered when BWP operations are switched from dormant BWP to non-dormant BWP operations. For example, because the UE 115-*a* may not transmit UL data or control information in dormant operations but may transmit after switching to non-dormant operations, a new PHR report may be transmitted for the non-dormant operations. In some cases, since dormancy switching may be indicated via a dormancy indication, switching-triggered PHR reporting may cause frequent and redundant PHR reporting due to the timescale of PDCCH transmissions.

SCell BWP dormancy state switching may cause frequent and redundant PHR report triggering may be avoided by implementing the timer 210 for PHR report triggering. For example, the UE 115-*a* may configure the PCell connection 205-*a* and the SCell connection 205-*b*. In some cases, a PHR report may be triggered based on the activation of the SCell. The base station 105-*a* may indicate to the UE 115-*a* (e.g., via dormancy DCI, PDCCH) to switch the SCell BWP from a first dormancy state to a second dormancy state (e.g., from dormant operations to non-dormant operations) which may trigger a PHR report. The PHR report may be triggered each time the base station transmits a dormancy indication to switch dormancy states which may be frequent and which may cause increased power consumption at the UE 115-*a*. In some cases, the UE 115-*a* may implement the timer 210 for PHR report triggering. For example, the PHR report may be triggered based on the activation of the SCell and the UE 115-*a* may initiate a timer based on the PHR report trigger. The network may indicate to the UE 115-*a* (e.g., via dormancy DCI, PDCCH) to switch the SCell BWP from a first dormancy state to a second dormancy state (e.g., from dormant operations to non-dormant operations) which may trigger a PHR report. The UE 115-*a* may determine a state of the timer 210 and may transmit the PHR report based on the dormancy indication and the state of the timer 210. In such cases, the PHR report may not be transmitted every time the base station transmits a dormancy indication to switch dormancy states and may be transmitted when identifying that the timer has expired which may avoid frequent and redundant PHR reporting by the UE 115-*a*. For example, if the timer expires or has expired and upon a change of an activated BWP to non-dormant DL BWP of the SCell connection 205-*b* the PHR report may be triggered. In some cases, the timer may be a phr-ProhibitTimer which may be implemented or used for other operations such as triggering a PHR report when the time has expired and a pathloss has exceeded a threshold for a serving cell associated with the UE 115-*a*. In this way, the timer may be used for multiple operations and may conserve operating overhead.

Figure 3:
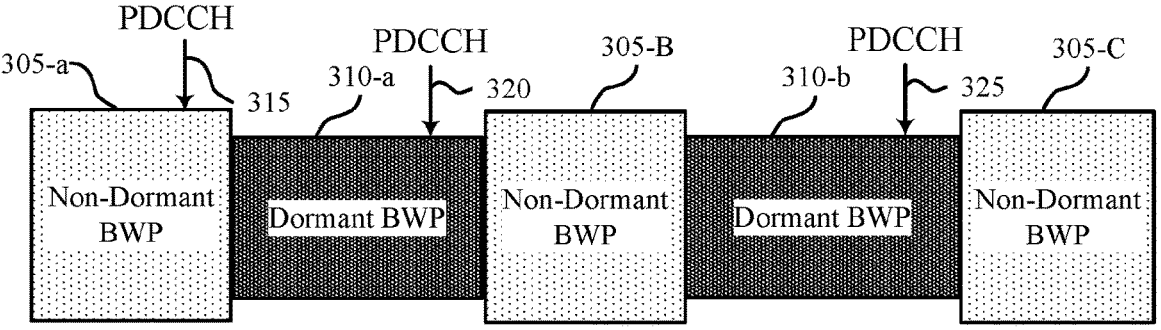
FIG. 3 illustrates an example of a wireless communications system that supports PHR report triggering by dormant BWP switching in accordance with aspects of the present disclosure.
Figure 3:
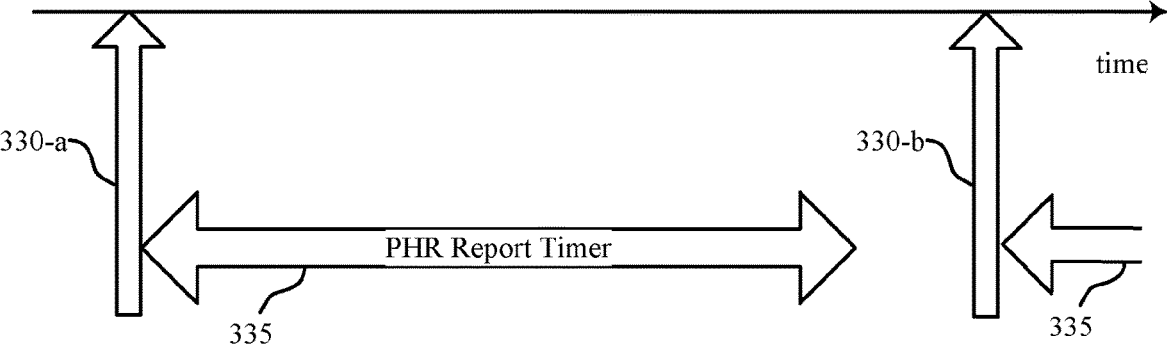
Figure 3:

FIG. 3 illustrates an example of a wireless communications system 300 that supports PHR report triggering by dormant BWP switching in accordance with aspects of the present disclosure. In some examples, wireless communications system 300 may implement aspects of wireless communications system 100.

Wireless communications system 300 may represent a scheme demonstrating how a mac entity with configured UL (e.g., UE 115-*a* in FIG. 2) switches from operating in a first BWP to operating in a second BWP on a SCell connection.

In some examples, a UE 115 (e.g., UE 115) may operate in one operation mode referred to as a dormant mode or another operation mode referred to as a non-dormant mode. The UE behavior in the dormant mode may be referred to or defined as "dormancy" or "dormancy-like" behavior and the UE behavior in the non-dormant mode may be referred to or defined as "normal," "non-dormancy," or "non-dormancy-like" behavior. When the UE 115 is in the non-dormant mode, one or more secondary cells communicating with UE 115 may be configured to perform normal communications with the UE 115 (e.g., the UE performs normal activity on the cell). However, when the UE 115 is in the dormant mode for the cell, the UE 115 may be configured to perform reduced or simplified communications via the cell as described herein. Accordingly, the UE 115 may enter a low activity mode and may, accordingly, have reduced power consumption.

In some examples, the UE 115 may operate in a particular BWP based on an operation mode of the UE 115. For instance, if the UE 115 is in a non-dormant mode, the UE 115 may operate over a non-dormant BWP 305 and if the UE 115 is in a dormant mode, the UE 115 may operate over a dormant BWP 310. When operating in the dormant BWP 310, the UE 115 may have reduced activity as compared to when operating in the non-dormant BWP 305. Additionally bandwidth may be smaller in the dormant BWP 310 (e.g., as wideband operations may not be performed in the dormant BWP 310). Additionally, the UE 115 may not transmit uplink data (e.g., via a PUSCH) or uplink control information (e.g., via a PUCCH) and may not receive data (e.g., via a physical downlink shared channel (PDSCH)) when configured for the dormant BWP 310. In the dormant mode, the UE 115 may not receive downlink control information (e.g., via a physical downlink control channel (PDCCH)). The UE 115, when configured for the dormant BWP 310, may transmit periodic transmission of SRS or perform periodic measurement of CSI with a periodicity longer than that which occurs when the UE 115 is operating in the non-dormant BWP 305. In some examples, the UE 115 may determine to sleep between periods for transmission or reception, which may enable the UE 115 to save power. When configured for the non-dormant BWP 305, which may be larger and thus may enable a larger data transmission rate, the UE 115 may have normal activity. The properties of non-dormant BWPs 305 and dormant BWPs 310 may be configured by a base station 105 (e.g., base station 105-*a*).

In some examples, the UE 115 may establish a connection with an SCell configured with a non-dormant BWP and may transmit a PHR report 330-*a*. The UE 115 may initiate a timer based on transmitting the PHR report 330-*a*. The UE 115 may receive, from the base station 105, an indication to switch from one operation mode to another operation mode. For instance, the UE 115 may receive dormancy DCI via a PDCCH at 315 indicating that the UE 115 is to switch from non-dormant BWP 305-*a* to dormant BWP 310-*a*. Similarly, the UE 115 may receive dormancy DCI via a PDCCH at 320 indicating that the UE 115 is to switch from dormant BWP 310 to non-dormant BWP 305-*b*. Performing this switch may realize a switch between regular behavior (e.g., 'dormancy-like' behavior when configured for the non-dormant BWP 305) and dormancy behavior (e.g., 'non-dormancy-like behavior' when configured for the dormant BWP 310). Performing the switch from dormant BWP 310-*a* to non-dormant BWP 305-*b* may also trigger a PHR report however PHR report timer 335 may be active at 320 and the UE 115 may not transmit a PHR report based on receiving the dormancy DCI and the active PHR report timer 335. However, the UE 115 may receive another dormancy DCI via a PDCCH at 325 indicating that the UE 115 is to switch from dormant BWP 310-*b* to non-dormant BWP 305-*c*. Performing the switch from dormant BWP 310-*b* to non-dormant BWP 305-*c* may also trigger a PHR report however PHR report timer 335 may expire or be expired at 325 and the UE

115 may transmit a PHR report 330-*b* based on receiving the dormancy DCI and the expired PHR report timer 335. The UE 115 may restart the PHR report timer 335 based on transmitting the PHR report 330-*b*.

Figure 4:
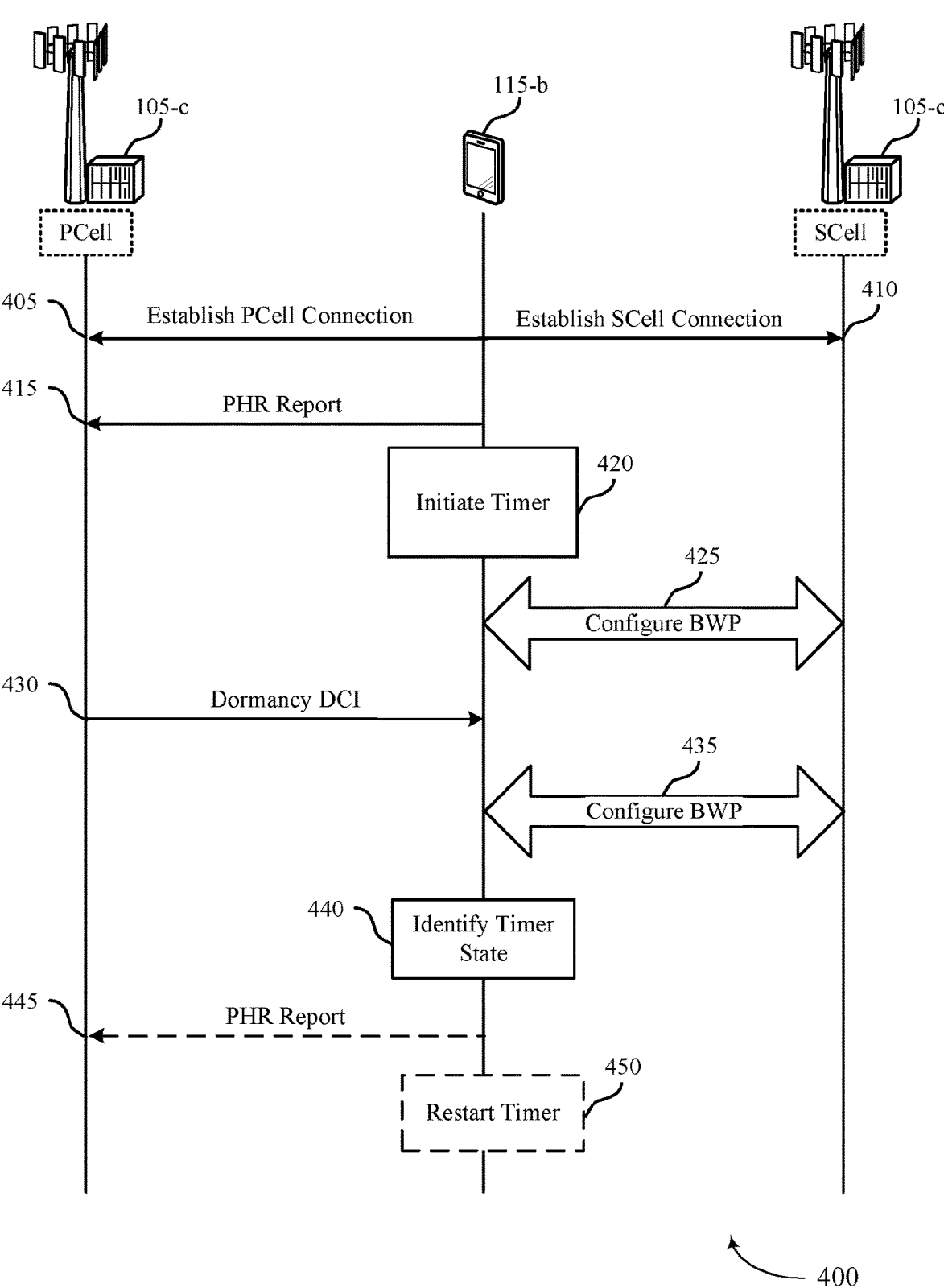
FIG. 4 illustrates an example of a process flow that supports PHR report triggering by dormant BWP switching in accordance with aspects of the present disclosure.

FIG. 4 illustrates an example of a process flow 400 that supports PHR report triggering by dormant BWP switching in accordance with aspects of the present disclosure. In some examples, process flow 400 may implement aspects of wireless communications system 100. Process flow 400 may be implemented by UE 115-*b* and a base station 105-*c*, and base station 105-*c* may support communications for UE 115-*b* over a PCell and an SCell. In other examples, process flow 400 may be implemented by multiple base stations supporting one or more PCell and SCell communication links for UE 115-*b*.

At 405, the UE 115-*b* may establish a PCell connection with the base station 105-*c* and at 410 may establish an SCell connections with the base station 105-*c* or with another base station 105 (not shown). In some cases, establishing the SCell connection may trigger a PHR report.

At 415, the UE 115-*b* may transmit a PHR report to the base station 105-*c* and at 420, may initiate a timer for PHR reporting based on the PHR transmission. The PHR report may include the PHR for one or more for the PSCell connection or the SCell connection. In some cases, the timer may be a phr-ProhibitTimer which may be implemented or used for other operations such as triggering a PHR report when the timer has expired and a pathloss has exceeded a threshold for a serving cell associated with the UE 115-*b* (not shown).

At 425, the UE 115-*b* may configure a BWP associated with the SCell connection to operate in a first dormancy state. In some cases, the first dormancy state is a dormant BWP state and the UE 115-*b* may operate according to a dormant configuration provided by the base station 105-*c*. For example, in dormant BWP operations the UE 115-*b* may reduce activity, may operate on a reduced bandwidth, may refrain from transmitting uplink data or control information (e.g., the UE 115-*b* may not transmit PUSCH, PUCCH, SRS), may not receive or monitor for downlink data or control transmissions, may reduce a periodicity of CSI measurement, may sleep between UL and DL transmission or reception and may generally implement power-saving operations, among other aspects.

At 430, the UE 115-*b* may receive from the base station 105-*c* over the PCell connection, a dormancy indication. In some examples, the dormancy indication indicates to the UE 115-*b* to configure the BWP to operate in a second dormancy state different from the first dormancy state. In some cases, the second dormancy state is a non-dormant BWP state.

At 435, the UE 115-*b* may configure the BWP associated with the SCell connection to operate in the second dormancy state (e.g., non-dormant BWP state). In some cases, the first dormancy state is a dormant BWP state and a UE may operate according to a non-dormant configuration provided by the base station 105-*c*. For example, in non-dormant BWP operations the UE 115-*b* may resume activity, may operate on an increased bandwidth, may transmitting uplink data or control information (e.g., the UE 115-*b* may transmit PUSCH, PUCCH, SRS), may receive or monitor for downlink data or control transmissions, may resume a periodicity of CSI measurement, among other aspects.

At 440, the UE 115-*b* may identify a state of the timer for PHR reporting. In some cases, the UE 115-*b* may identify that the timer for PHR reporting is active and may refrain from transmitting a PHR report based at least in part on the status of the timer and the indication to configure the BWP to operate in the second dormancy state. In some cases, the UE 115-*b* may identify that the timer for PHR reporting is or has expired and, at 445, may transmit the PHR report based at least in part on the status of the timer and the indication to configure the BWP to operate in the second dormancy state.

At 450, based on transmitting the PHR report at 445, the UE 115-*b* may restart or reinitiate the timer for PHR reporting. In some cases, the length of the duration of the time for PHR reporting is configured by the base station 105-*c* via RRC signaling.

Figure 5:
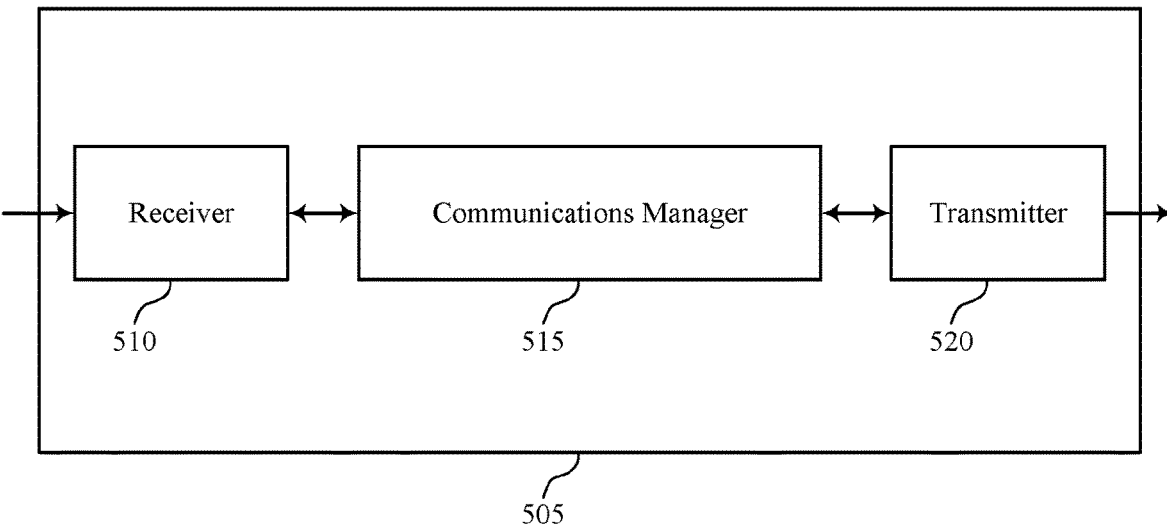
FIGS. 5 and 6 show block diagrams of devices that support PHR report triggering by dormant BWP switching in accordance with aspects of the present disclosure.

FIG. 5 shows a block diagram 500 of a device 505 that supports PHR report triggering by dormant BWP switching in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to PHR report triggering by dormant BWP switching, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a PCell connection and an SCell connection at the UE, initiate, at the UE, a timer for PHR reporting by the UE based on activating the SCell connection, configure a BWP associated with the SCell connection to operate in a first dormancy state, receive an indication to configure the BWP to operate in a second dormancy state different from the first dormancy state, configure the BWP associated with the SCell connection to operate in the second dormancy state based on the indication, and determine to refrain from transmitting a PHR report based on a status of the timer for PHR reporting and the indication to configure the BWP to operate in the second dormancy state. The communications manager 515 may be an example of aspects of the communications manager 810 described herein.

The actions performed by the communications manager 515 as described herein may be implemented to realize one or more potential advantages. One implementation may allow a UE 115 to save power and increase battery life by refraining from transmitting a PHR report before a PHR report timer has expired. Another implementation may provide improved quality and reliability of service at the UE 115, as latency and the number of separate resources allocated to the UE 115 may be reduced.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
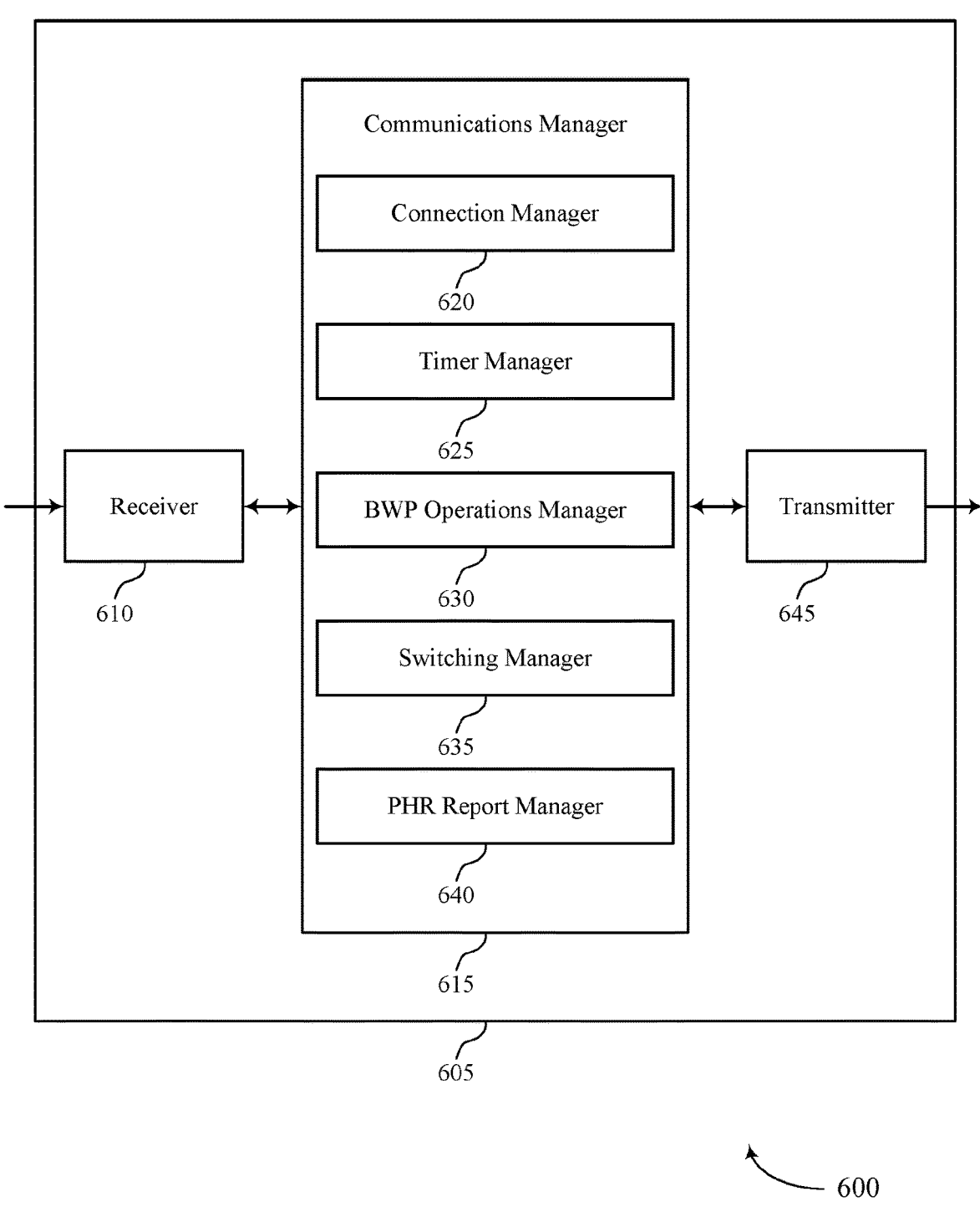

FIG. 6 shows a block diagram 600 of a device 605 that supports PHR report triggering by dormant BWP switching in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to PHR report triggering by dormant BWP switching, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection manager 620, a timer manager 625, a BWP operations manager 630, a switching manager 635, and a PHR report manager 640. The communications manager 615 may be an example of aspects of the communications manager 810 described herein.

The connection manager 620 may establish a PCell connection and an SCell connection at the UE.

The timer manager 625 may initiate, at the UE, a timer for PHR reporting by the UE based on activating the SCell connection.

The BWP operations manager 630 may configure a BWP associated with the SCell connection to operate in a first dormancy state and receive an indication to configure the BWP to operate in a second dormancy state different from the first dormancy state.

The switching manager 635 may configure the BWP associated with the SCell connection to operate in the second dormancy state based on the indication.

The PHR report manager 640 may determine to refrain from transmitting a PHR report based on a status of the timer for PHR reporting and the indication to configure the BWP to operate in the second dormancy state.

Based on configuring the bandwidth part associated with the secondary cell connection to operate in the second dormancy state, a processor of a UE 115 (e.g., controlling the receiver 610, the transmitter 645, or the transceiver 820 as described with reference to FIG. 8) may efficiently determine to refrain from transmitting a PHR report based at least in part on a status of the timer for PHR reporting and the indication to configure the BWP. Further, the processor of UE 115 may identify that the timer for power headroom reporting has expired. The processor of the UE 115 may turn on one or more processing units for transmitting the PHR report, increase a processing clock, or a similar mechanism within the UE 115. As such, PHR report is transmitted, the processor may be ready to respond more efficiently through the reduction of a ramp up in processing power. The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
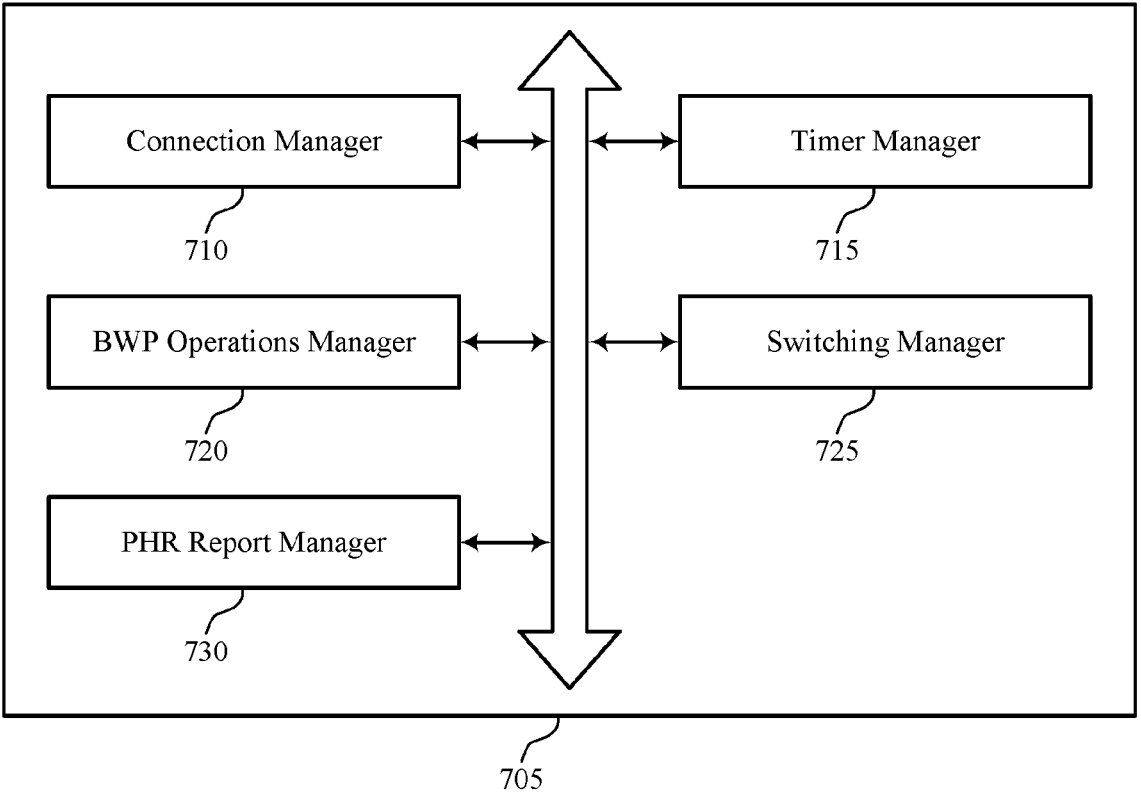
FIG. 7 shows a block diagram of a communications manager that supports PHR report triggering by dormant BWP switching in accordance with aspects of the present disclosure.

FIG. 7 shows a block diagram 700 of a communications manager 705 that supports PHR report triggering by dormant BWP switching in accordance with aspects of the present disclosure. The communications manager 705 may be an example of aspects of a communications manager 515, a communications manager 615, or a communications manager 810 described herein. The communications manager 705 may include a connection manager 710, a timer manager 715, a BWP operations manager 720, a switching manager 725, and a PHR report manager 730. Each of these modules may communicate, directly or indirectly, with one another (e.g., via one or more buses).

The connection manager 710 may establish a PCell connection and an SCell connection at the UE. The timer manager 715 may initiate, at the UE, a timer for PHR reporting by the UE based on activating the SCell connection. In some examples, the timer manager 715 may identify that the timer for PHR reporting has expired. In some examples, the timer manager 715 may restart, at the UE, the timer for PHR reporting by the UE based on transmitting the PHR report. In some examples, the timer manager 715 may identify that the timer for PHR reporting is active. In some examples, the timer manager 715 may initiate the timer for PHR reporting is based on a previous PHR report transmission. In some examples, the timer manager 715 may receive a downlink control message indicating a duration for the timer. In some examples, the timer manager 715 may configure the timer according to the duration. In some cases, the timer includes a phr-ProhibitTimer.

The BWP operations manager 720 may configure a BWP associated with the SCell connection to operate in a first dormancy state. In some examples, the BWP operations manager 720 may receive an indication to configure the BWP to operate in a second dormancy state different from the first dormancy state. In some examples, the BWP operations manager 720 may receive the indication in a physical downlink control channel transmission. In some examples, receiving a dormancy state configuration that includes one or more dormancy parameters for operating in the first dormancy state or the second dormancy state. In some cases, the indication includes dormancy DCI. In some cases, the first dormancy state is a dormant state and the second dormancy state is a non-dormant state.

The switching manager 725 may configure the BWP associated with the SCell connection to operate in the second dormancy state based on the indication. In some examples, the switching manager 725 may configure the BWP associated with the SCell connection to change from a dormant state to a non-dormant state, where the BWP is associated with a medium access control (MAC) entity with configured uplink.

The PHR report manager 730 may determine to refrain from transmitting a PHR report based on a status of the timer for PHR reporting and the indication to configure the BWP to operate in the second dormancy state. In some examples, the PHR report manager 730 may determine to transmit the PHR report based on identifying that the timer for PHR reporting has expired. In some examples, the PHR report manager 730 may refrain from transmitting the PHR report based on identifying that the timer for PHR reporting is active.

Figure 8:
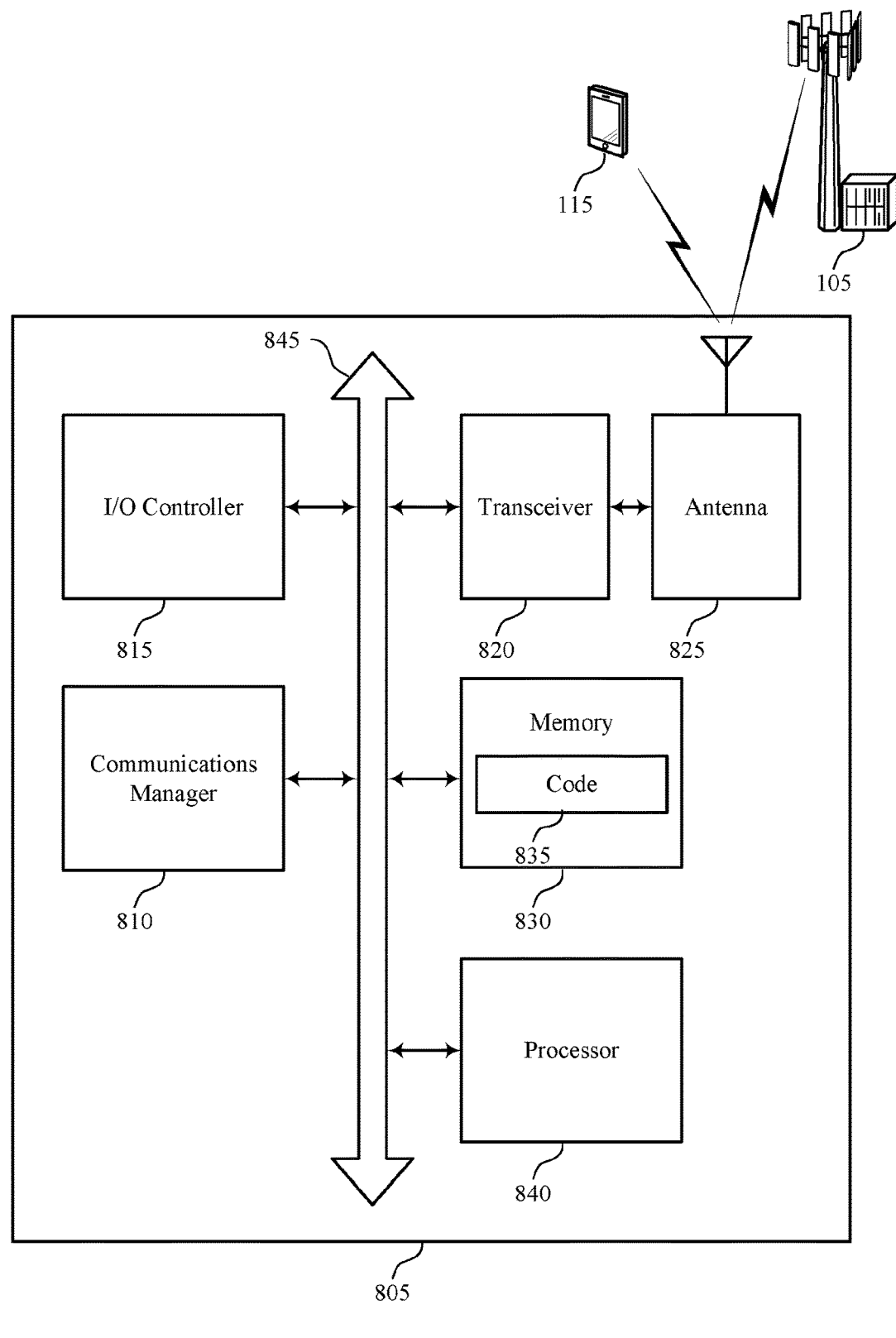
FIG. 8 shows a diagram of a system including a device that supports PHR report triggering by dormant BWP switching in accordance with aspects of the present disclosure.

FIG. 8 shows a diagram of a system 800 including a device 805 that supports PHR report triggering by dormant BWP switch in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a PCell connection and an SCell connection at the UE, initiate, at the UE, a timer for PHR reporting by the UE based on activating the SCell connection, configure a BWP associated with the SCell connection to operate in a first dormancy state, receive an indication to configure the BWP to operate in a second dormancy state different from the first dormancy state, configure the BWP associated with the SCell connection to operate in the second dormancy state based on the indication, and determine to refrain from transmitting a PHR report based on a status of the timer for PHR reporting and the indication to configure the BWP to operate in the second dormancy state.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting PHR report triggering by dormant BWP switching).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The actions performed by the processor 840, memory 830, I/O controller 815, communications manager 810, transceiver 820, and antenna 825 as described herein may be implemented to realize one or more potential advantages. One implementation may allow the device 805 to save power and increase battery life by refraining from transmitting a PHR report before a PHR report timer has expired. Another implementation may provide improved data throughput and user experience at the device 805 through the reduction of signaling overhead.

FIG. 9 shows a flowchart illustrating a method 900 that supports PHR report triggering by dormant BWP switching in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may establish a PCell connection and an SCell connection at the UE. The operations of 905 may be performed according to the methods described herein. In some examples, aspects of the operations of 905 may be performed by a connection manager as described with reference to FIGS. 5 through 8.

At 910, the UE may initiate, at the UE, a timer for PHR reporting by the UE based on activating the SCell connection. The operations of 910 may be performed according to the methods described herein. In some examples, aspects of the operations of 910 may be performed by a timer manager as described with reference to FIGS. 5 through 8.

At 915, the UE may configure a BWP associated with the SCell connection to operate in a first dormancy state. The operations of 915 may be performed according to the methods described herein. In some examples, aspects of the operations of 915 may be performed by a BWP operations manager as described with reference to FIGS. 5 through 8.

At 920, the UE may receive an indication to configure the BWP to operate in a second dormancy state different from the first dormancy state. The operations of 920 may be performed according to the methods described herein. In some examples, aspects of the operations of 920 may be performed by a BWP operations manager as described with reference to FIGS. 5 through 8.

At 925, the UE may configure the BWP associated with the SCell connection to operate in the second dormancy state based on the indication. The operations of 925 may be performed according to the methods described herein. In some examples, aspects of the operations of 925 may be performed by a switching manager as described with reference to FIGS. 5 through 8.

At 930, the UE may determine to refrain from transmitting a PHR report based on a status of the timer for PHR reporting and the indication to configure the BWP to operate in the second dormancy state. The operations of 930 may be performed according to the methods described herein. In some examples, aspects of the operations of 930 may be performed by a PHR report manager as described with reference to FIGS. 5 through 8.

FIG. 10 shows a flowchart illustrating a method 1000 that supports PHR report triggering by dormant BWP switching in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may establish a PCell connection and an SCell connection at the UE. The operations of 1005 may be performed according to the methods described herein. In some examples, aspects of the operations of 1005 may be performed by a connection manager as described with reference to FIGS. 5 through 8.

At 1010, the UE may initiate, at the UE, a timer for PHR reporting by the UE based on activating the SCell connection. The operations of 1010 may be performed according to the methods described herein. In some examples, aspects of the operations of 1010 may be performed by a timer manager as described with reference to FIGS. 5 through 8.

At 1015, the UE may configure a BWP associated with the SCell connection to operate in a first dormancy state. The operations of 1015 may be performed according to the methods described herein. In some examples, aspects of the operations of 1015 may be performed by a BWP operations manager as described with reference to FIGS. 5 through 8.

At 1020, the UE may receive an indication to configure the BWP to operate in a second dormancy state different from the first dormancy state. The operations of 1020 may be performed according to the methods described herein. In some examples, aspects of the operations of 1020 may be performed by a BWP operations manager as described with reference to FIGS. 5 through 8.

At 1025, the UE may configure the BWP associated with the SCell connection to operate in the second dormancy state based on the indication. The operations of 1025 may be performed according to the methods described herein. In some examples, aspects of the operations of 1025 may be performed by a switching manager as described with reference to FIGS. 5 through 8.

At 1030, the UE may determine to refrain from transmitting a PHR report based on a status of the timer for PHR reporting and the indication to configure the BWP to operate in the second dormancy state. The operations of 1030 may be performed according to the methods described herein. In some examples, aspects of the operations of 1030 may be performed by a PHR report manager as described with reference to FIGS. 5 through 8.

At 1035, the UE may identify that the timer for PHR reporting has expired. The operations of 1035 may be performed according to the methods described herein. In some examples, aspects of the operations of 1035 may be performed by a timer manager as described with reference to FIGS. 5 through 8.

At 1040, the UE may determine to transmit the PHR report based on identifying that the timer for PHR reporting has expired. The operations of 1040 may be performed according to the methods described herein. In some examples, aspects of the operations of 1040 may be performed by a PHR report manager as described with reference to FIGS. 5 through 8.

FIG. 11 shows a flowchart illustrating a method 1100 that supports PHR report triggering by dormant BWP switching in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may establish a PCell connection and an SCell connection at the UE. The operations of 1105 may be performed according to the methods described herein. In some examples, aspects of the operations of 1105 may be performed by a connection manager as described with reference to FIGS. 5 through 8.

At 1110, the UE may initiate, at the UE, a timer for PHR reporting by the UE based on activating the SCell connection. The operations of 1110 may be performed according to the methods described herein. In some examples, aspects of the operations of 1110 may be performed by a timer manager as described with reference to FIGS. 5 through 8.

At 1115, the UE may configure a BWP associated with the SCell connection to operate in a first dormancy state. The operations of 1115 may be performed according to the methods described herein. In some examples, aspects of the operations of 1115 may be performed by a BWP operations manager as described with reference to FIGS. 5 through 8.

At 1120, the UE may receive an indication to configure the BWP to operate in a second dormancy state different from the first dormancy state. The operations of 1120 may be performed according to the methods described herein. In some examples, aspects of the operations of 1120 may be performed by a BWP operations manager as described with reference to FIGS. 5 through 8.

At 1125, the UE may configure the BWP associated with the SCell connection to operate in the second dormancy state based on the indication. The operations of 1125 may be performed according to the methods described herein. In some examples, aspects of the operations of 1125 may be performed by a switching manager as described with reference to FIGS. 5 through 8.

At 1130, the UE may determine to refrain from transmitting a PHR report based on a status of the timer for PHR reporting and the indication to configure the BWP to operate in the second dormancy state. The operations of 1130 may be performed according to the methods described herein. In some examples, aspects of the operations of 1130 may be performed by a PHR report manager as described with reference to FIGS. 5 through 8.

At 1135, the UE may identify that the timer for PHR reporting is active. The operations of 1135 may be performed according to the methods described herein. In some examples, aspects of the operations of 1135 may be performed by a timer manager as described with reference to FIGS. 5 through 8.

At 1140, the UE may refrain from transmitting the PHR report based on identifying that the timer for PHR reporting is active. The operations of 1140 may be performed according to the methods described herein. In some examples, aspects of the operations of 1140 may be performed by a PHR report manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   establishing a primary cell connection and a secondary cell connection at the UE;
   initiating, at the UE, a timer for power headroom reporting by the UE based at least in part on activating the secondary cell connection;
   configuring a bandwidth part associated with the secondary cell connection to operate in a dormant state;
   receiving an indication to configure the bandwidth part to operate in a non-dormant state;
   configuring the bandwidth part associated with the secondary cell connection to operate in the non-dormant state based at least in part on the indication; and
   determining to refrain from transmitting a power headroom report based at least in part on a status of the timer for power headroom reporting and the indication to configure the bandwidth part to operate in the non-dormant state.

2. The method of claim 1, wherein determining whether to transmit the power headroom report further comprises:
   identifying that the timer for power headroom reporting has expired; and
   determining to transmit the power headroom report based at least in part on identifying that the timer for power headroom reporting has expired.

3. The method of claim 2, further comprising:
   restarting, at the UE, the timer for power headroom reporting by the UE based at least in part on transmitting the power headroom report.

4. The method of claim 1, wherein determining whether to transmit the power headroom report further comprises:
   identifying that the timer for power headroom reporting is active; and
   refraining from transmitting the power headroom report based at least in part on identifying that the timer for power headroom reporting is active.

5. The method of claim 1, wherein receiving the indication to configure the bandwidth part to operate in the non-dormant state:
   receiving the indication in a physical downlink control channel transmission.

6. The method of claim 5, wherein the indication comprises dormancy downlink control information (DCI).

7. The method of claim 1, wherein:

initiating the timer for power headroom reporting is based at least in part on a previous power headroom report transmission.

8. The method of claim 1, wherein configuring the bandwidth part associated with the secondary cell connection to operate in the non-dormant state comprises:

configuring the bandwidth part associated with the secondary cell connection to change from the dormant state to the non-dormant state, wherein the bandwidth part is associated with a medium access control (MAC) entity with configured uplink.

9. The method of claim 1, further comprising:

receiving a downlink control message indicating a duration for the timer; and configuring the timer according to the duration.

10. The method of claim 1, further comprising:

receiving a dormancy state configuration that comprises one or more dormancy parameters for operating in the dormant state or the non-dormant state.

11. The method of claim 1, wherein the timer comprises a phr-ProhibitTimer.

12. An apparatus for wireless communications at a user equipment (UE), comprising:

at least one processor; and at least one memory coupled with the at least one processor, with instructions stored in the at least one memory, the instructions being executable by the at least one processor to cause the apparatus to:

establish a primary cell connection and a secondary cell connection at the UE;

initiate, at the UE, a timer for power headroom reporting by the UE based at least in part on activating the secondary cell connection;

configure a bandwidth part associated with the secondary cell connection to operate in a dormant state;

receive an indication to configure the bandwidth part to operate in a non-dormant state;

configure the bandwidth part associated with the secondary cell connection to operate in the non-dormant state based at least in part on the indication; and determine to refrain from transmitting a power headroom report based at least in part on a status of the timer for power headroom reporting and the indication to configure the bandwidth part to operate in the non-dormant state.

13. The apparatus of claim 12, wherein the instructions to determine whether to transmit the power headroom report further are executable by the at least one processor to cause the apparatus to:

identify that the timer for power headroom reporting has expired; and determine to transmit the power headroom report based at least in part on identifying that the timer for power headroom reporting has expired.

14. The apparatus of claim 13, wherein the instructions are further executable by the at least one processor to cause the apparatus to:

restart, at the UE, the timer for power headroom reporting by the UE based at least in part on transmitting the power headroom report.

15. The apparatus of claim 12, wherein the instructions to determine whether to transmit the power headroom report further are executable by the at least one processor to cause the apparatus to:

identify that the timer for power headroom reporting is active; and refrain from transmitting the power headroom report based at least in part on identifying that the timer for power headroom reporting is active.

16. The apparatus of claim 12, wherein the instructions to receive the indication to configure the bandwidth part to operate in the non-dormant state are executable by the at least one processor to cause the apparatus to:

receive the indication in a physical downlink control channel transmission.

17. The apparatus of claim 16, wherein the indication comprises dormancy downlink control information (DCI).

18. The apparatus of claim 12, wherein initiating the timer for power headroom reporting is based at least in part on a previous power headroom report transmission.

19. The apparatus of claim 12, wherein the instructions to configure the bandwidth part associated with the secondary cell connection to operate in the non-dormant state are executable by the at least one processor to cause the apparatus to:

configure the bandwidth part associated with the secondary cell connection to change from the dormant state to the non-dormant state, wherein the bandwidth part is associated with a medium access control (MAC) entity with configured uplink.

20. The apparatus of claim 12, wherein the instructions are further executable by the at least one processor to cause the apparatus to:

receive a downlink control message indicating a duration for the timer; and configure the timer according to the duration.

21. The apparatus of claim 12, wherein the instructions are further executable by the at least one processor to cause the apparatus to:

receive a dormancy state configuration that comprises one or more dormancy parameters for operating in the dormant state or the non-dormant state.

22. The apparatus of claim 12, wherein the timer comprises a phr-ProhibitTimer.

23. An apparatus for wireless communications at a user equipment (UE), comprising:

means for establishing a primary cell connection and a secondary cell connection at the UE;

means for initiating, at the UE, a timer for power headroom reporting by the UE based at least in part on activating the secondary cell connection;

means for configuring a bandwidth part associated with the secondary cell connection to operate in a dormant state;

means for receiving an indication to configure the bandwidth part to operate in a non-dormant state;

means for configuring the bandwidth part associated with the secondary cell connection to operate in the non-dormant state based at least in part on the indication; and means for determining to refrain from transmitting a power headroom report based at least in part on a status of the timer for power headroom reporting and the indication to configure the bandwidth part to operate in the non-dormant state.

24. The apparatus of claim 23, wherein the means for determining whether to transmit the power headroom report further comprises:

means for identifying that the timer for power headroom reporting has expired; and means for determining to transmit the power headroom report based at least in part on identifying that the timer for power headroom reporting has expired.

25. The apparatus of claim 24, further comprising:

means for restarting, at the UE, the timer for power headroom reporting by the UE based at least in part on transmitting the power headroom report.

26. The apparatus of claim 23, wherein the means for determining whether to transmit the power headroom report further comprises:

means for identifying that the timer for power headroom reporting is active; and means for refraining from transmitting the power headroom report based at least in part on identifying that the timer for power headroom reporting is active.

27. The apparatus of claim 23, wherein the means for receiving the indication to configure the bandwidth part to operate in the non-dormant state comprises:

means for receiving the indication in a physical downlink control channel transmission.

28. The apparatus of claim 27, wherein the indication comprises dormancy downlink control information (DCI).

29. The apparatus of claim 23, wherein initiating the timer for power headroom reporting is based at least in part on a previous power headroom report transmission.

30. The apparatus of claim 23, wherein the means for configuring the bandwidth part associated with the secondary cell connection to operate in the non-dormant state comprises:

means for configuring the bandwidth part associated with the secondary cell connection to change from the dormant state to the non-dormant state, wherein the bandwidth part is associated with a medium access control (MAC) entity with configured uplink.

31. The apparatus of claim 23, further comprising:

means for receiving a downlink control message indicating a duration for the timer; and means for configuring the timer according to the duration.

32. The apparatus of claim 23, further comprising:

means for receiving a dormancy state configuration that comprises one or more dormancy parameters for operating in the dormant state or the non-dormant state.

33. A non-transitory computer-readable medium storing code for wireless communications at a user equipment (UE), the code comprising instructions executable by a processor to:

establish a primary cell connection and a secondary cell connection at the UE;

initiate, at the UE, a timer for power headroom reporting by the UE based at least in part on activating the secondary cell connection;

configure a bandwidth part associated with the secondary cell connection to operate in a dormant state;

receive an indication to configure the bandwidth part to operate in a non-dormant state;

configure the bandwidth part associated with the secondary cell connection to operate in the non-dormant state based at least in part on the indication; and determine to refrain from transmitting a power headroom report based at least in part on a status of the timer for power headroom reporting and the indication to configure the bandwidth part to operate in the non-dormant state.

* * * * *